US010015353B1

(12) United States Patent
Perez

(10) Patent No.: US 10,015,353 B1
(45) Date of Patent: Jul. 3, 2018

(54) METHOD AND SYSTEM OF USING IPV6 PACKET EXTENSIONS TO ALLOW OR PREVENT EXECUTION OF A JOB BASED ON PHYSICAL LOCATION

(71) Applicant: KONICA MINOLTA LABORATORY U.S.A., INC., San Mateo, CA (US)

(72) Inventor: Maria Perez, Half Moon Bay, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/393,917

(22) Filed: Dec. 29, 2016

(51) Int. Cl.
*H04N 1/32* (2006.01)
*H04L 29/12* (2006.01)
*H04L 29/06* (2006.01)
*H04W 4/02* (2018.01)
*H04N 1/00* (2006.01)
*H04N 1/333* (2006.01)

(52) U.S. Cl.
CPC ..... *H04N 1/32117* (2013.01); *H04L 61/6059* (2013.01); *H04L 69/22* (2013.01); *H04N 1/00307* (2013.01); *H04N 1/00915* (2013.01); *H04N 1/00925* (2013.01); *H04N 1/32021* (2013.01); *H04N 1/33384* (2013.01); *H04W 4/023* (2013.01); *H04N 2201/0094* (2013.01); *H04N 2201/3223* (2013.01); *H04N 2201/3253* (2013.01)

(58) Field of Classification Search
USPC ........................................................ 358/1.14
See application file for complete search history.

(56) References Cited

U.S. PATENT DOCUMENTS

| 8,750,297 | B2 | 6/2014 | Liu | |
|---|---|---|---|---|
| 2005/0018645 | A1* | 1/2005 | Mustonen | H04L 29/12311 370/349 |
| 2006/0209760 | A1* | 9/2006 | Saito | H04L 29/12311 370/331 |
| 2012/0250076 | A1* | 10/2012 | Kumar | G06F 3/1206 358/1.15 |
| 2013/0107312 | A1* | 5/2013 | Venkatesh | G06F 3/1207 358/1.15 |
| 2016/0316089 | A1* | 10/2016 | Kamoi | H04N 1/00962 |

* cited by examiner

*Primary Examiner* — Ngon Nguyen
(74) *Attorney, Agent, or Firm* — Buchanan Ingersoll & Rooney PC

(57) ABSTRACT

A method, a computer readable medium, and a multi-function peripheral are disclosed, which use IPv6 packet extensions for execution of a job request based on proximity. The method including sending a job to be processed by a multi-function peripheral with an IPv6 Destination Options extension header from a client device to the multi-function peripheral, the IPv6 Destination Options extension header containing a physical location of the client device; receiving the job with the IPv6 Destination Options extension header containing the physical location of the client device on the multi-function peripheral; examining the IPv6 Destination Options extension header containing the physical location of the client device on the multi-function peripheral; and executing the job if the physical location of the client device is within a defined proximity to the multi-function peripheral.

20 Claims, 5 Drawing Sheets

METHOD AND SYSTEM OF USING IPV6 PACKET EXTENSIONS TO ALLOW OR PREVENT EXECUTION OF A JOB BASED ON PHYSICAL LOCATION

FIELD OF THE INVENTION

The present invention relates to a method and system of using IPv6 packet extensions to allow or prevent execution of a job based on location, and particularly to a device, such as a mobile device, smart phone, or Internet of Things (IOT) device, and a host device, such as a multi-function peripheral (MFP), and which allows or prevents printing/scanning/faxing based on a physical location of the mobile device, the smart phone, or the IOT device combined with a physical location of the MFP using IPv6 packet extensions.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. The IPv6 network protocol provides that IPv6 hosts or host devices (for example, image forming apparatuses and other devices) can configure themselves automatically (i.e., stateless address autoconfiguration) when connected to an IPv6 network using ICMPv6 neighbor discovery messages (i.e., Neighbor Discovery Protocol or NDP).

IPv6 addresses are represented as eight groups of four hexadecimal digits with the groups being separated by colons. The IPv6 packet has two parts, a header and a payload. The header consists of a fixed portion followed by optional extensions to implement special features. The fixed header occupies the first 40 octets (320 bits) of the IPv6 packet and includes the source and destination addresses, traffic classification options, a hop counter, and the type of the optional extension or payload, which follows the header. Extension headers carry options that can be used for special treatment of a packet in the network, for example, for routing, fragmentation, and for security using the IPsec framework.

When first connecting to a network, an IPv6 host (or node) sends a link-local multicast neighbor solicitation request advertising its tentative link-local address for double address detection (dad), and if no problem is encountered, the host uses the link-local address. The router solicitations are sent (or router advertisements are received depending on timing) to obtain network-layer configuration parameters, and routers respond to such a request with a router advertisement packet that contains network-layer configuration parameters.

SUMMARY OF THE INVENTION

It would be desirable to have an application associated with a host or client device, such as a mobile phone, smart phone, or IOT device, which uses IPv6 packet extensions to allow or prevent printing/scanning/faxing on a printer based on a physical location of the mobile phone, the smart phone or the IOT device.

A method is disclosed of using IPv6 packet extensions for execution of a job request based on proximity, the method comprising: sending a job to be processed by a multi-function peripheral with an IPv6 Destination Options extension header from a client device to the multi-function peripheral, the IPv6 Destination Options extension header containing a physical location of the client device; receiving the job with the IPv6 Destination Options extension header containing the physical location of the client device on the multi-function peripheral; examining the IPv6 Destination Options extension header containing the physical location of the client device on the multi-function peripheral; monitoring the physical location of the client device; and executing the job if the physical location of the client device is within a defined proximity to the multi-function peripheral.

A computer program product comprising a non-transitory computer usable medium having a computer readable code embodied therein, which uses IPv6 packet extensions for execution of a job request based on proximity is disclosed, the process comprising: receiving a job to be processed by a multi-function peripheral with an IPv6 Destination Options extension header containing a physical location of a client device; examining the IPv6 Destination Options extension header containing the physical location of the client device on the multi-function peripheral; monitoring the physical location of the client device; and executing the job if the physical location of the client device is within a defined proximity to the multi-function peripheral.

A multi-function peripheral is disclosed, which uses IPv6 packet extensions for execution of a job request based on proximity, the multi-function peripheral comprising: a processor configured to: receive a job to be processed by the multi-function peripheral with the IPv6 Destination Options extension header containing a physical location of a client device; examine the IPv6 Destination Options extension header containing the physical location of the client device on the multi-function peripheral; monitor the physical location of the client device; and execute the job if the physical location of the client device is within a defined proximity to the multi-function peripheral.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
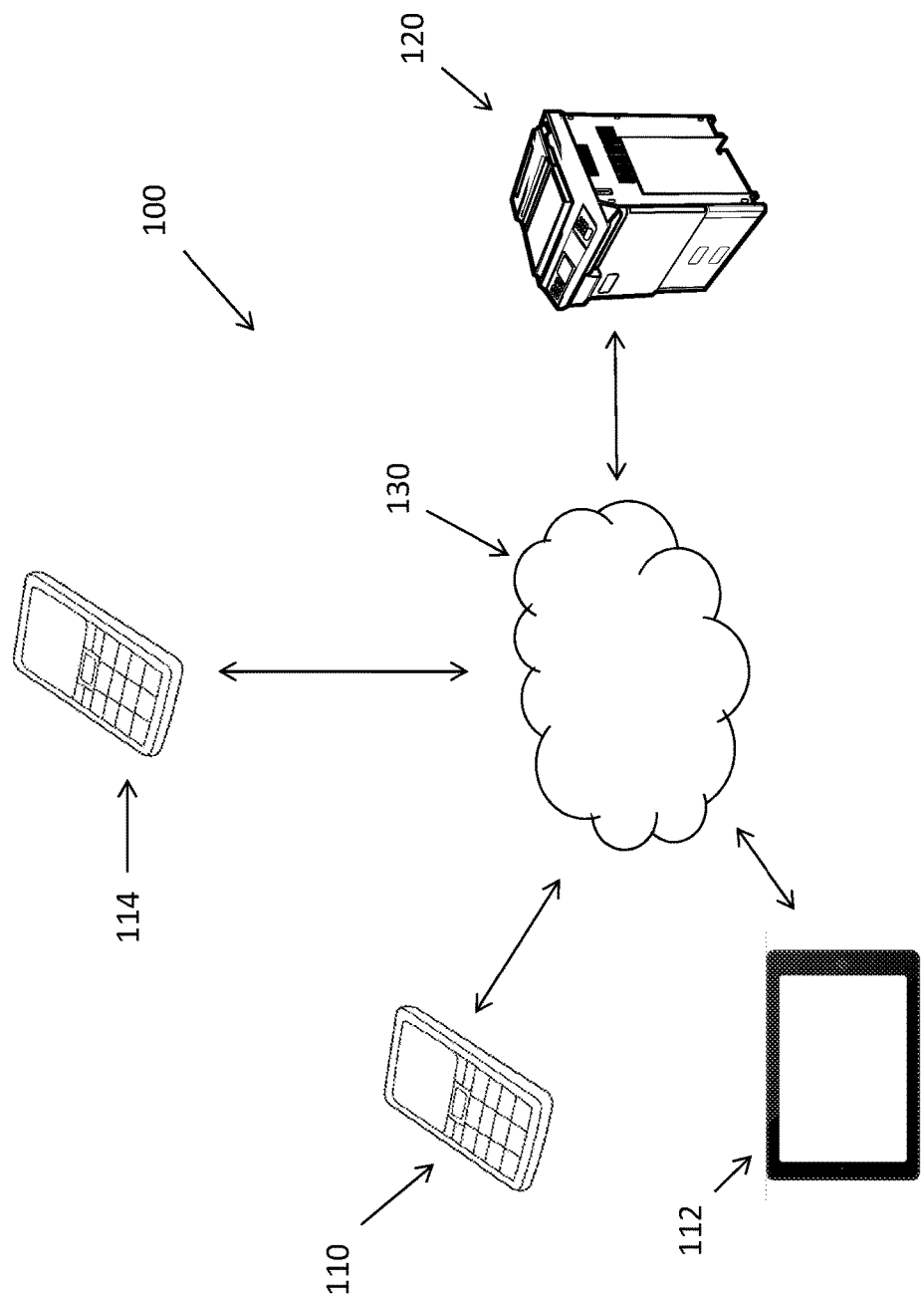
FIG. 1 is an illustration of a system, which allows or prevents printing/scanning/faxing based on physical location or proximity of a mobile device or IOT to a multi-function peripheral (MFP) or printer using IPv6 packet extensions in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, it would be desirable for a user with a smart phone, tablet or IOT device which has authenticated the user via, for example, fingerprint or any other authentication protocol when approaching a multi-function peripheral (MFP) or printer in which a job request has been assigned or sent, the job request would be processed based on the proximity of the user with the MFP or printer. For example, in accordance with an exemplary embodiment, the job request could be a print job, a scan job, a copy job, and/or a fax job.

In accordance with an exemplary embodiment, the MFP or printer will communicate with the user's IOT device location and job combination, via IPv6 packet extension headers. For example, in accordance with an exemplary embodiment, if the IOT device of the user, for example, a smart phone or mobile device is within a defined proximity or threshold to the MFP or printer, the MFP or printer will execute the job request. However, in accordance with an exemplary embodiment, as soon as the physical location of the user identified by the IOT device moves beyond the defined proximity or the threshold to the MFP or printer, the MFP can automatically suspend or cancel the job request associated with the transaction.

In accordance with an exemplary embodiment, the implementation of IPv6 is being adopted by all networking infrastructure and IOT devices. For example, be it a phone, a watch, or a television (TV), the devices are connected wirelessly to the network, IPv6 packets are available. Thus, MFP or printing devices could use the available resources to communicate and control the physical security of the jobs being processed. However, since existing technologies currently require a lot of infrastructure for proximity based application, it would be desirable to have available technology, which provides simple mechanisms to provide physical MFP job security.

An IPv6 packet is the smallest message entity exchanged via the Internet Protocol across an Internet Protocol version 6 (IPv6) network. The packets can consist of control information for addressing and routing, and a payload consisting of user data. The control information in IPv6 packets is subdivided into a mandatory fixed header and optional extension headers. The payload of an IPv6 packet is typically a datagram or segment of the higher-level Transport Layer protocol, but may be data for an Internet Layer, for example, ICMPv6, or Link Layer, for example, OSPF instead.

The fixed header of an IPv6 packet consists of its first 40 octets (320 bits), and extension headers, which can carry optional Internet Layer information, and are placed between the fixed header and the upper-layer protocol header. In addition, there are several extension headers defined in the IPv6 RFC. For example, the destination options header carries optional information only examined by the packet's destination. In accordance with an exemplary embodiment, the IPv6 extension headers can be used to provide physical location correlated with job information and authentication information obtained from an IOT device, such as a mobile device or mobile phone, a watch, a tablet, communicating with an MFP.

In accordance with an exemplary embodiment, for example, when a user, has a presentation on a phone and wants to print the presentation, the user sends a job request to the MFP. Within such packet at the IPv6 level, an IPv6 Destination Options extension header can be created which contains the user's physical location. If the user's physical location is within a certain distance threshold (or proximity) of the physical location of the MFP, the MFP will start the operation, and send the response back at the IPv6 level in an Destination Options extension header, which can contain a combination of the job identifier and the physical location of the user.

In accordance with an exemplary embodiment, when the user leaves the threshold or proximity set or determined by a system administrator for the MFP, the MFP can stop, or cancel the operation immediately. In addition, in accordance with another exemplary embodiment, the MFP can cancel or stop the job, for example, due to any abrupt network configuration changes, such as updating the IPv6 address or completely updating the neighbor cache table such that the user is no longer reachable. In addition, when the user stays within the threshold and the network connectivity does not have any abrupt changes, any IPv6 packets between the MFP and user IOT have an IPv6 Destination Options extension header that allows the MFP to continue processing the job.

FIG. 1 is an illustration of a system 100, which allows or prevents printing/scanning/faxing based on physical location or proximity of one or more client devices 110, 112, 114 to a host device 120 using IPv6 packet extensions in accordance with an exemplary embodiment. In accordance with an exemplary embodiment, the one or more client devices 110, 112, 114 can be a smart phone, a smart tablet, a personal digital assistance, or an IOT device, which communicates with the at least one host device 120, which is preferably a multi-function peripheral (MFP), a printer, or a print server through an IPv6 communication network 130 in a state capable of performing data communications. IOT devices 110, 112, 114, for example, can include watches, televisions, gaming consoles, smart phones, smart tables, vehicles, building, thermostats, and other devices, which include electronics, software, sensors, actuators, and network connectivity that enable these devices to collect and exchange data.

In accordance with an exemplary embodiment, the one or more client devices 110, 112, 114, and the at least one host device 120 can be network devices, which support an IPv6 communication protocol (Internet Protocol version 6).

Examples of communication networks 130 consistent with embodiments of the invention include, but are not limited to, the Internet, an Intranet, a local area network (LAN) and a wide area network (WAN). The client and host devices 110, 112, 114, 120 can be connected with a wireless connection by using radio frequency (RF), infrared (IR) transmission, IEEE1394 and/or other suitable wireless technology.

In accordance with an exemplary embodiment, the client device 110, 112, 114, which may be embodied by a smart phone, a smart tablet, or a IOT device, and generates the printing data usable in a printer, a print server, or multifunction peripheral (MFP) 120 and transmits the generated printing data to the MFP 120. An example of the at least one client device 110, 112, 114, may include a portable device or mobile device such as a notebook personal computer, a cellular phone, a watch, a personal digital assistant (PDA) or an IOT device. The client device 110, 112, 114, preferably includes a receiver or module for receiving signals from a global satellite system (for example, global positioning system or GPS), which can deter a geographic location, including latitude and longitude, using the received GPS signals. In addition, the at least one client device 110, 112, 114, can determine its physical location using other technologies. For example, if the physical location of a wireless access gateway (e.g., a cellular tower) is known, and the client device 110, 112, 114, for example, a mobile device can detect the wireless access gateway, the mobile device can then estimate a current physical location using a physical location of the detected wireless access gateway. The physical location of wireless access gateways can be stored in a location database. In some instances, the mobile device may determine the current location using triangulation based on strength of the signals received from the wireless access gateways and their locations.

In accordance with an exemplary embodiment, the at least one client device 110, 112, 114 can also preferably include an authentication module, which authenticates a user, for example, by fingerprint recognition or authentication, or other authentication protocol, which are currently implemented or will be implemented on smart phones and mobile devices. For example, a password authentication protocol, which uses credentials, such as username and password can be used.

In addition, the client device 110, 112, 114, can include a printer driver program (hereinafter, sometimes simply referred to as a printer driver), and the client device 110, 112, 114, can use the function of the printer driver to generate a print job including the data of print conditions to be applied at the time of image formation, and image data, and sends the generated print job to the host device 120.

In accordance with an exemplary embodiment, each of the one or more client devices 110, 112, 114, can include a processor or central processing unit (CPU), and one or more memories for storing software programs and data (such as files to be printed). The processor or CPU carries out the instructions of a computer program, which operates and/or controls at least a portion of the functionality of the client devices 110, 112, 114. Each of the client devices 110, 112, 114, can also include an operating system (OS), which manages the computer hardware and provides common services for efficient execution of various software programs. For example, the software programs can include application software and printer driver software. Examples of client devices 110, 112, 114, can include and are not limited to smart phones, smart tablets, personal digital assistants (PDAs) and/or IOT devices.

In accordance with an exemplary embodiment, the host device 120 can be a multi-function peripheral (MFP), which includes at least a copy function, an image reading function, a facsimile (fax) function, and a printer function, and forms an image on a sheet based on a print job (print instruction) received, from the at least one client device 110, 112, 114, from, for example, a client device in the form of a mobile device, smart phone, personal digital assistant, or IOT device.

In accordance with an exemplary embodiment, the host device 120, which is preferably a multi-function peripheral (MFP) or printer 120 can be connected to the one or more client devices 110, 112, 114, via a communication network 130, which communicates and transmits data via IPv6 protocol. The one or more client devices 110, 112, 114, can be configured to submit print jobs to the at least one multifunction printers or printers 120 by transmitting data representing the documents to be printed and information describing the print job. The at least one multifunction printer or printer 120 can include a printer controller (or firmware), a memory section preferably in the form of a hard disk drive (HDD), an image processing section (or data dispatcher), a print engine, and an input/output (I/O) section.

In accordance with an exemplary embodiment, data may be transmitted in encrypted or unencrypted form between the nodes of the communication network (or network) 130 using a variety of different communication protocols including, for example, various Internet layer, transport layer, or application layer protocols. For example, data may be transmitted via the networks 130 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

Figure 2:
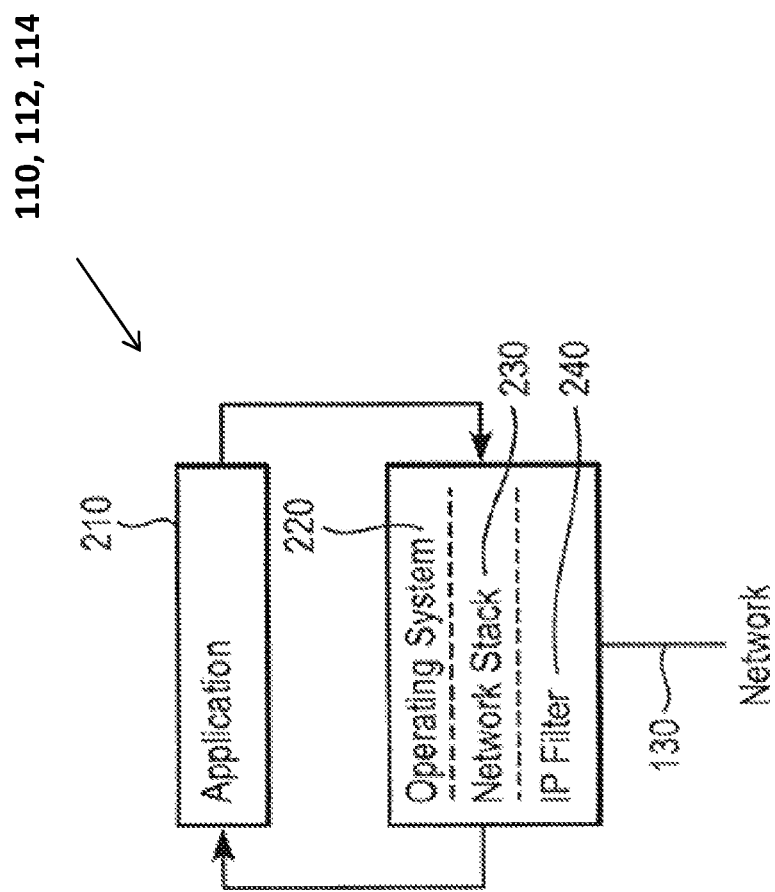
FIG. 2 is an illustration of a network stack for a client device having an application, which allows or prevents printing/scanning/faxing based on physical location or proximity of a mobile device or IOT to a multi-function peripheral (MFP) or printer using IPv6 packet extensions in accordance with an exemplary embodiment.

FIG. 2 is an illustration of a network stack for a client device 110, 112, 114, having an application 210 for filtering data packets in accordance with an exemplary embodiment. As shown in FIG. 2, the client device 110 112, 114 has a software module (or application) 210 and an IP filter (or packet capture filter) 240, which captures (or intercepts) outgoing and incoming data packets having neighbor solicitation and/or neighbor advertisement requests pursuant to the IPv6 protocol. As shown in FIG. 2, the software module 210 is preferably an application level module, which is configured to modify, drop, change, and judge IPv6 packets as described herein. In accordance with an exemplary embodiment, the software module 210 can be part of the printer driver and/or firmware of the client devices 110, 112, 114, or a separate software module or application, or part to the operating system of the client devices 110, 112, 114.

In accordance with an exemplary embodiment, the IP filter 240 forwards the incoming or outgoing IPv6 packets as described herein to the host device 120. Each of the client devices 110, 112, 114 preferably includes a software module (or application) 210, which can perform at least a portion and/or more preferably all of the steps necessary to set a physical location, for example, a GPS location of the client device and security options as described herein.

The packets (or packages) are preferably broadcast and/or sent out via a communication network, for example, an IPv6 network 130. In accordance with an exemplary embodiment, the IP filter 240 preferably captures the IPv6 packet before the initial broadcast (i.e., Neighbor Discovery) and/or alternatively, before the packet is sent to the Network Stack 230 for processing. In accordance with an exemplary embodiment, the software module's 210 functionality also can be enabled or disabled at will by a network administrator or other designated individual.

The client device 110, 112, 114 can include an operating system 220 (OS), which acts as an interface between the device's hardware and application programs, and which is also responsible for the management and coordination of activities and the sharing of the resources within host devices. In accordance with an exemplary embodiment, the software module 210 runs on the operating system 220 of the client device 110, 112, 114, and the network layer is under or a part of the operating system 220. It can be appreciated that by utilizing a software module 210 as described herein, the operating system of the host device 200 does not need to be altered or changed in anyway.

Alternatively, it can be appreciated that in accordance with another exemplary embodiment, the operating system (OS) 220 can be configured to perform the methods as described herein. The examples as set forth herein are exemplary only, and as such, additional security options, which use the IPv6 Destination Options extension header, can be implemented without departing from the present disclosure.

Figure 3:
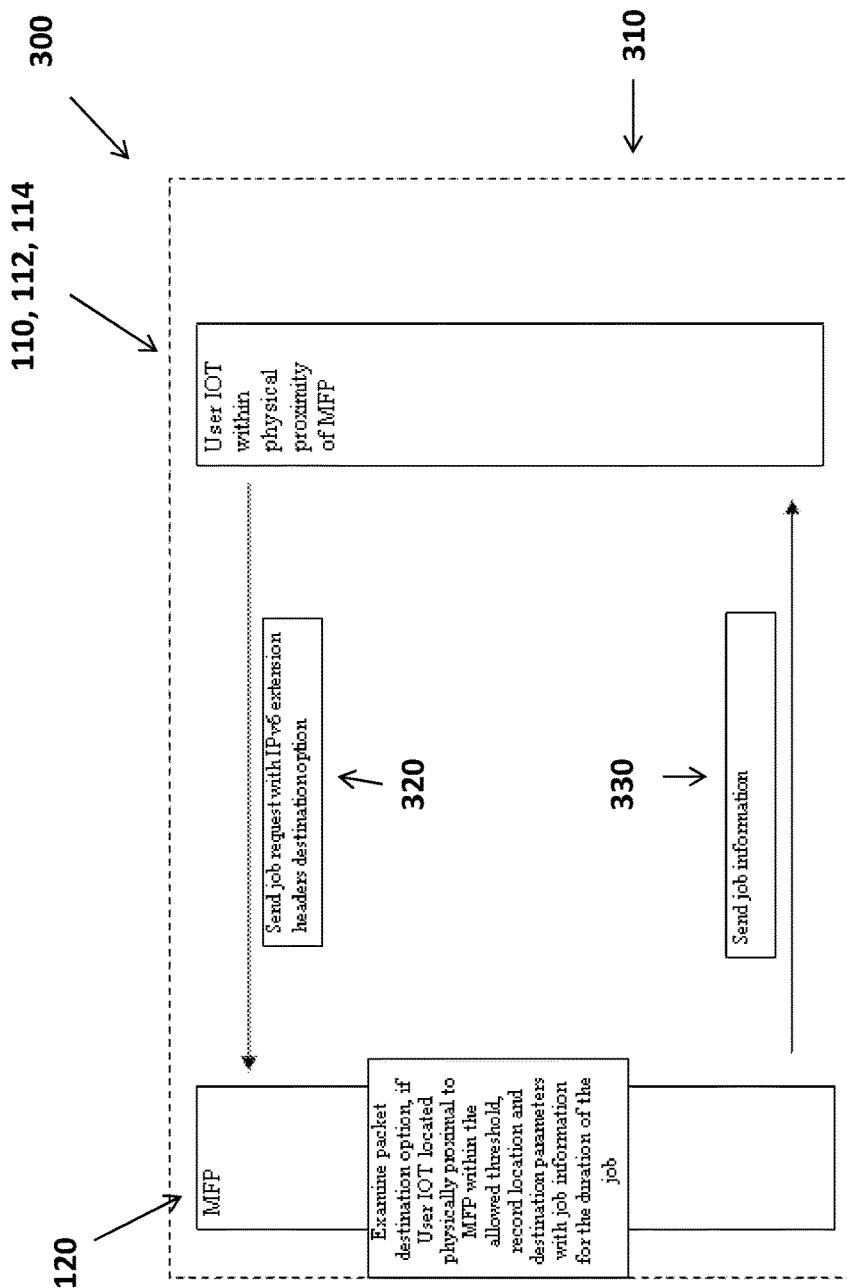
FIG. 3 is a flow chart illustrating an exchange of IPv6 packets between a multi-function peripheral (MFP) and a client device or IOT in accordance with an exemplary embodiment in which the client device or IOT is within a predetermined physical proximity or physical location of the multi-function peripheral (MFP).

FIG. 3 is a flow chart 300 illustrating an exchange of IPv6 packets between a multi-function peripheral (MFP) 120 and a client device or IOT 110, 112 in accordance with an exemplary embodiment in which the client device or IOT device is within a predetermined physical proximity or location 310 of the MFP 120. As shown in FIG. 3, in accordance with an exemplary embodiment, the client device 110, 112, 114, for example, a mobile device, can send a job request 320 with an IPv6 Destination Options extension headers, which contains a location of the at least one client device 110. The location of the at least one client device 110, 112, 114 can be established by known location methods, for example, a GPS receiver within the at least one client device, manually inputting a location into the at least one client device, by Link Local, or, for example, wireless access gateway (e.g., a cellular tower). In accordance with an exemplary embodiment, the Destination Options extension header only needs to be examined by the destination node(s).

As shown in FIG. 3, the MFP 120 receives the packet and the packet destination option is examined. If the at least one client 110, 112, 114, is physically located or in proximity to the MFP 120 within a defined destination parameter or allowed threshold, the MFP 120 records the location and destination parameters from the destination options headers with the job information for the duration of the job. In accordance with an exemplary embodiment, for example, the MFP 120 can be configured to have a set or predetermined time frame (or period) for the job to be executed, and, if the at least one client device 110, 112, 114 is not within the defined proximity to the MFP 120 within the set time frame, the job can be canceled.

In step 330, the job information is sent to the at least one client device 110 after the packet has been examined and determined that the client device or IOT device 110, 112, 114 is physically located within the defined or allowed threshold or defined parameters. For example, in accordance with an exemplary embodiment, the job information can include confirmation that a print job has been executed by the MFP 120. Alternatively, for example, if the job request is for documents or information hosted by the MFP 120, the documents or information can be sent to the client device or IOT device 110, 112, 114.

Figure 4:
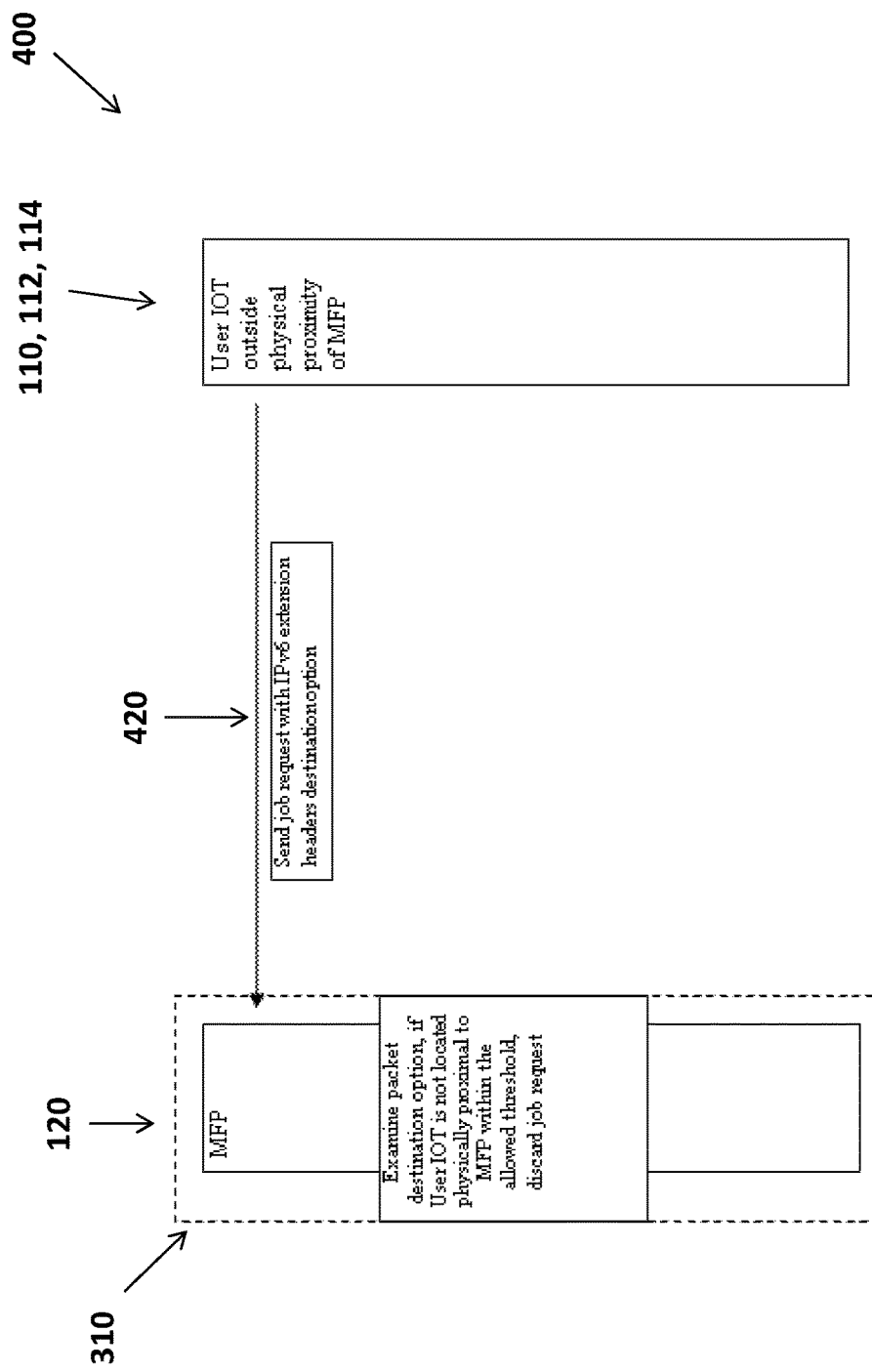
FIG. 4 is a flow chart illustrating an exchange of IPv6 packets between a multi-function peripheral (MFP) and a client device or IOT in accordance with an exemplary embodiment in which the client device or IOT is outside of a predetermined physical proximity or physical location of the multi-function peripheral (MFP).

FIG. 4 is a flow chart 400 illustrating an exchange of IPv6 packets between a multi-function peripheral (MFP) 120 and a client device or IOT 110, 112, 114 in accordance with an exemplary embodiment in which the client device or IOT 110, 112, 114 is outside of a predetermined physical proximity or location 310 of the MFP 120. As shown in FIG. 4, the at least one client device 110, 112, 114 sends a job request 420 with an IPv6 Destination Options extension headers, which contains a location of the at least one client device 110, 112, 114. As set forth above, the location of the at least one client device 110, 112, 114 can be established by known location methods, for example, a GPS receiver within the at least one client device, manually inputting a location into the at least one client device 110, 112, 114, by Link Local, or, for example, wireless access gateway (e.g., a cellular tower). The MFP 120 receives the packet and the packet destination option is examined. If the at least one client 110, 112, 114 is not physically located or not in proximity to the MFP 120 with a defined destination or proximity parameters or allowed threshold, the MFP 120 discards or drops the job request.

In accordance with an exemplary embodiment, the MFP 120 can immediately drop the job request if the at least one client device 120 is not physically located within the defined destination or proximity parameters or allowed threshold. Alternatively, the MFP 120 can hold the job request for a set period of time, and if the MFP 120 does not detect the presence of the at least one client device 110, 112, 114 within the defined destination or proximity parameters or allowed threshold within the set period of time, the job request can be dropped or discarded. For example, a print job could be sent from an individual residence and upon arriving at the office, the MFP 120 upon detecting the physical location of the at least one client device 110, 112, 114, within the defined destination or proximity parameters, can print the print job on the MFP 120.

Figure 5:
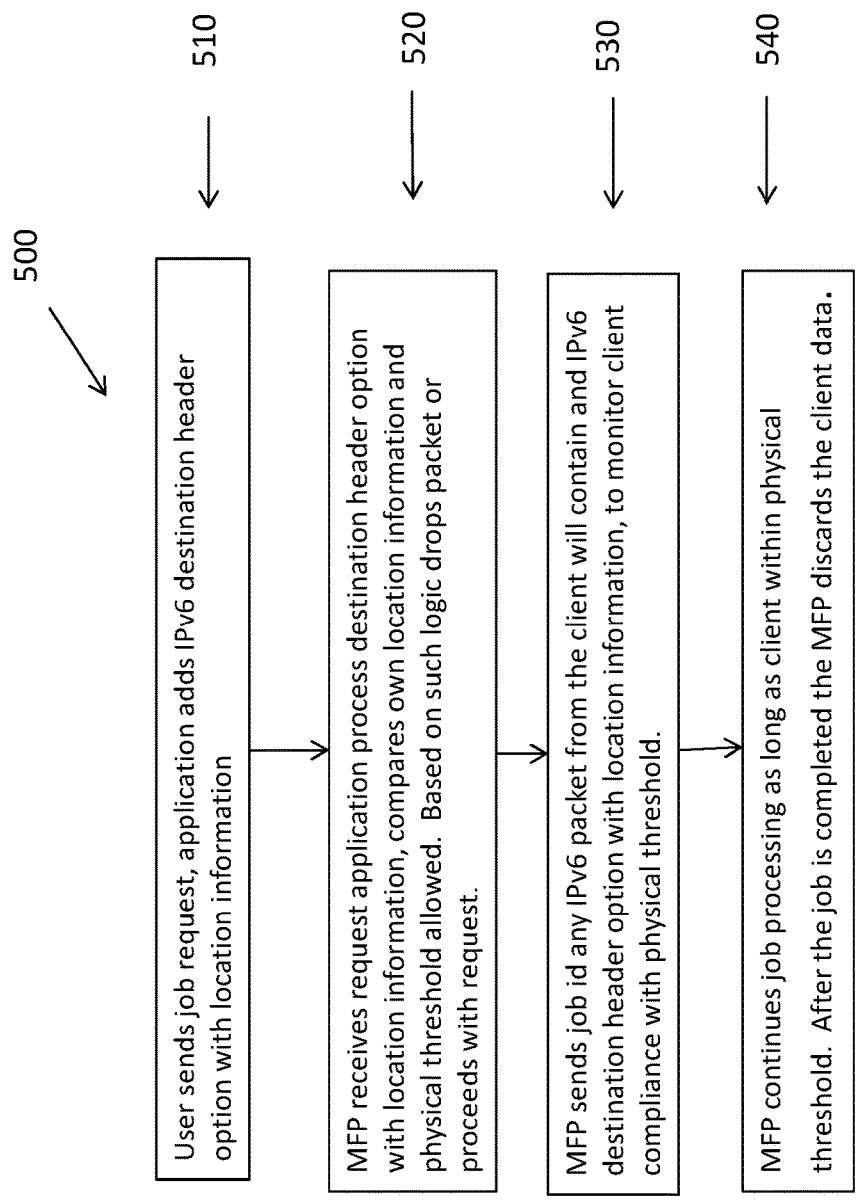
FIG. 5 is a flow chart illustrating the exchange of IPv6 packets between a multi-function peripheral (MFP) and a client device or IOT device in accordance with an exemplary embodiment.

FIG. 5 is a flow chart 500 illustrating the exchange of IPv6 packets between at least one client device of IOT device 110, 112, 114, and a multi-function peripheral (MFP) 120 in accordance with an exemplary embodiment. As shown in FIG. 5, in step 510, the user sends a job request from at least one client device 110, 112, 114, and the application 210 on the at least one client device 110, 112, 114, adds an IPv6 destination header option with location information. In step 520, the MFP 120 receives request application process destination header option with location information, compares its own location information (i.e., physical location of the MFP 120) and physical threshold allowed. Specifically, for example, the MFP 120 determines if the location information within the IPv6 Destination Options extension header within the proximity parameters or physical threshold. Based on such logic, the MFP 120 can either drops or hold the packets, or if the location information is within the defined parameters or threshold, the MFP 120 can proceed with request. In step 530, the MFP 120 sends job id and can be configured to monitor any additional IPv6 packets from client containing the IPv6 destination header option with location information confirm that the at least one client device 110, 112, 114 is in continuous compliance with the physical proximity threshold, if required. In step 540, the MFP 120 continues with the processing of the job request as long as client within physical threshold. After the job is complete, the MFP 120 can discard the client data, for example, on the physical location information of the at least one client device 110, 112, 114.

In accordance with an exemplary embodiment, a computer program product comprising a non-transitory computer usable medium having a computer readable code embodied therein, which uses IPv6 packet extensions for execution of a job request based on proximity is disclosed, the process comprising: receiving a job to be processed by a multi-function peripheral with an IPv6 Destination Options extension header containing a physical location of a client device; examining the IPv6 Destination Options extension header containing the physical location of the client device on the multi-function peripheral; monitoring the physical location of the client device; and executing the job if the physical location of the client device is within a defined proximity to the multi-function peripheral.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of using Internet Protocol version 6 (IPv6) packet extensions for execution of a job request based on proximity, the method comprising:
    sending a job to be processed by a multi-function peripheral in an IPv6 packet from a processor of a mobile client device to the multi-function peripheral, the IPv6 packet having a mandatory fixed header and optional extension headers, the mandatory fixed header comprising a source address, a destination addresses, traffic classification options, and a hop counter, and the optional extension headers having an IPv6 Destination Options extension header containing a physical location of the mobile client device;
    receiving the job with the IPv6 Destination Options extension header containing the physical location of the mobile client device on the multi-function peripheral;
    examining the IPv6 Destination Options extension header containing the physical location of the mobile client device on the multi-function peripheral;
    monitoring the physical location of the mobile client device; and
    executing the job if the physical location of the mobile client device is within a defined proximity to the multi-function peripheral.

2. The method of claim 1, comprising:
    discarding the job if the physical location of the mobile client device is not within the defined proximity to the multi-function peripheral.

3. The method of claim 1, comprising:
    setting a physical location of the multi-function peripheral; and
    comparing the physical location of the multi-function peripheral and the physical location of the mobile client device to determine if the mobile client device is with the defined proximity to the multi-function peripheral.

4. The method of claim 1, comprising:
    suspending the execution of the job if the physical location of the mobile client device moves beyond the defined proximity to the multi-function peripheral.

5. The method of claim 4, comprising:
    processing the job as long as the mobile client device remains within the defined proximity to the multi-function peripheral.

6. The method of claim 1, comprising:
    disposing of the physical location of the mobile client device upon completion of the job.

7. The method of claim 1, comprising:
    setting a time frame for the job to be executed; and
    canceling the job if the mobile client device is not within the defined proximity to the multi-function peripheral within the set time frame.

8. The method of claim 1, comprising:
    executing the job as long at the mobile client device is within the defined proximity to the multi-function peripheral.

9. The method of claim 1, wherein the job is a print job, a scan job, a copy job, or a facsimile job.

10. The method of claim 9, comprising
    sending the print job from the mobile client device to the multi-function peripheral at least partially over a wireless network;
    receiving the print job on the multi-function peripheral; and
    printing the print job on the multi-function peripheral.

11. A computer program product comprising a non-transitory computer usable medium having a computer readable code embodied therein, which uses Internet Protocol version 6 (IPv6) packet extensions for execution of a job request based on proximity, the process comprising:
    receiving a job to be processed by a multi-function peripheral in an IPv6 packet, the IPv6 packet having a mandatory fixed header and optional extension headers, the mandatory fixed header comprising a source address, a destination addresses, traffic classification options, and a hop counter, and the optional extension headers having an IPv6 Destination Options extension header containing a physical location of a mobile client device;
    examining the IPv6 Destination Options extension header containing the physical location of the mobile client device on the multi-function peripheral;
    monitoring the physical location of the mobile client device; and
    executing the job if the physical location of the mobile client device is within a defined proximity to the multi-function peripheral.

12. The computer program product of claim 11, comprising:
    discarding the job if the physical location of the mobile client device is not within the defined proximity to the multi-function peripheral.

13. The computer program product of claim 11, comprising:
    setting a physical location of the multi-function peripheral; and comparing the physical location of the multi-function peripheral and the physical location of the mobile client device to determine if the mobile client device is with the defined proximity to the multi-function peripheral.

14. The computer program product of claim 11, comprising:
suspending the execution of the job if the physical location of the mobile client device moves beyond the defined proximity to the multi-function peripheral; and
processing the job as long as the mobile client device remains within the defined proximity to the multi-function peripheral.

15. The computer program product of claim 11, comprising:
setting a time frame for the job to be executed; and
canceling the job if the mobile client device is not within the defined proximity to the multi-function peripheral within the set time frame.

16. A multi-function peripheral, which uses Internet Protocol version 6 (IPv6) packet extensions for execution of a job request based on proximity, the multi-function peripheral comprising:
a processor configured to:
receive a job to be processed by the multi-function peripheral in an IPv6 packet, the IPv6 packet having a mandatory fixed header and optional extension headers, the mandatory fixed header comprising a source address, a destination addresses, traffic classification options, and a hop counter, and the optional extension headers having the IPv6 Destination Options extension header containing a physical location of a mobile client device;
examine the IPv6 Destination Options extension header containing the physical location of the mobile client device on the multi-function peripheral;
monitor the physical location of the mobile client device; and
execute the job if the physical location of the mobile client device is within a defined proximity to the multi-function peripheral.

17. The multi-function peripheral of claim 16, wherein the processor is configured to:
discard the job if the physical location of the mobile client device is not within the defined proximity to the multi-function peripheral.

18. The multi-function peripheral of claim 16, wherein the processor is configured to:
set a physical location of the multi-function peripheral; and
compare the physical location of the multi-function peripheral and the physical location of the mobile client device to determine if the mobile client device is with the defined proximity to the multi-function peripheral.

19. The multi-function peripheral of claim 16, wherein the processor is configured to:
suspend the execution of the job if the physical location of the mobile client device moves beyond the defined proximity to the multi-function peripheral; and
process the job as long as the mobile client device remains within the defined proximity to the multi-function peripheral.

20. The multi-function peripheral of claim 16, wherein the processor is configured to:
set a time frame for the job to be executed; and
cancel the job if the mobile client device is not within the defined proximity to the multi-function peripheral within the set time frame.

* * * * *